US012801508B2

(12) United States Patent
Ramanujan et al.

(10) Patent No.: US 12,801,508 B2
(45) Date of Patent: Nov. 17, 2026

(54) UTILIZATION-BASED RESOURCE ALLOCATION IN MODEL-AS-A-SERVICE PLATFORM

(71) Applicant: Microsoft Technology Licensing, LLC, Redmond, WA (US)

(72) Inventors: Sanjay Ramanujan, Redmond, WA (US); Karthik Raman, Sammamish, WA (US); Hemant Kumar, Bellevue, WA (US); Fnu Sidhartha, Redmond, WA (US); Wenbin Meng, Bellevue, WA (US); Rakesh Kelkar, Bellevue, WA (US); Bo Hu, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 305 days.

(21) Appl. No.: 18/652,445

(22) Filed: May 1, 2024

(65) Prior Publication Data

US 2025/0342100 A1 Nov. 6, 2025

(51) Int. Cl.
*G06F 11/34* (2006.01)

(52) U.S. Cl.
CPC ...... *G06F 11/3428* (2013.01); *G06F 11/3414* (2013.01); *G06F 11/3447* (2013.01)

(58) Field of Classification Search
CPC ............ G06F 11/3428; G06F 11/3414; G06F 11/3447
USPC .......................................................... 702/186
See application file for complete search history.

(56) References Cited

U.S. PATENT DOCUMENTS 7,877,250 B2 * 1/2011 Oslake ...................... G06F 8/20 703/22
12,147,513 B1 11/2024 Jain
12,321,783 B2 * 6/2025 Nakfour ................ G06F 9/5011
2017/0019345 A1 * 1/2017 Yamasaki ................. G06F 9/46
2019/0019267 A1 * 1/2019 Suresh .................. G06F 9/5066
(Continued)

OTHER PUBLICATIONS

"Azure OpenAI Service models", Retrived from internet URL: https://web.archive.org/web/20240414173940/https://learn.microsoft.com/en-us/azure/ai-services/openai/concepts/models, Apr. 14, 2024, 08 pages.

(Continued)

*Primary Examiner* — Zhen Y Wu
(74) *Attorney, Agent, or Firm* — Holzer Patel Drennan

(57) ABSTRACT

A model-as-a-service (MaaS) platform performs cross-model resources allocation from a shared pool of GPU resources based on model-agnostic metrics generated by a metric standardizer. The metric standardizer receives, from model providers, model-specific benchmark metrics that define relationships between resource utilization and token processing according to the different model-specific tokenization schemes; receives, from one or more MaaS components, token-based job metrics pertaining to LLM processing tasks; and determines, based on the model-specific benchmark metrics and token-based job metrics, the model-agnostic metrics for multiple model pools executing instances of different large language models (LLMs) that generate and process text according to different model-specific tokenization schemes. The MaaS platform further includes one or more resource allocation components that dynamically reallocates resources of the shared pool based on the model-agnostic metric.

20 Claims, 5 Drawing Sheets

(56) References Cited

U.S. PATENT DOCUMENTS

| | | | | |
|---|---|---|---|---|
| 2019/0042322 | A1* | 2/2019 | Calhoun | G06F 9/505 |
| 2019/0377395 | A1* | 12/2019 | Kaburlasos | G06F 1/28 |
| 2020/0044938 | A1* | 2/2020 | Dias | G06F 9/5044 |
| 2020/0348979 | A1* | 11/2020 | Calmon | G06F 9/5027 |
| 2021/0149727 | A1* | 5/2021 | Calmon | G06F 9/445 |
| 2022/0131610 | A1 | 4/2022 | Nakura | |
| 2022/0188569 | A1* | 6/2022 | Ananthanarayanan | G06N 3/10 |
| 2024/0086249 | A1 | 3/2024 | Hu | |
| 2024/0311192 | A1 | 9/2024 | Maschmeyer | |
| 2024/0311198 | A1 | 9/2024 | Chen | |
| 2024/0370302 | A1 | 11/2024 | Daniel | |
| 2025/0238274 | A1 | 7/2025 | Kelly | |
| 2025/0245061 | A1* | 7/2025 | Sinha | G06F 9/4881 |
| 2025/0259045 | A1 | 8/2025 | Jayatunga | |
| 2025/0292023 | A1 | 9/2025 | Kuperman | |
| 2025/0307543 | A1* | 10/2025 | Djuhera | G06F 40/20 |
| 2025/0342063 | A1 | 11/2025 | Ramanujan | |
| 2025/0342066 | A1 | 11/2025 | Ramanujan | |
| 2026/0072741 | A1 | 3/2026 | Inoue | |

OTHER PUBLICATIONS

"Azure OpenAI Service provisioned throughput—Azure AI services ¦ Microsoft Learn", Retrived from internet URL: https://web.archive.org/web/20240406040832/https://learn.microsoft.com/en-us/azure/ai-services/openai/concepts/provisioned-throughput, Apr. 6, 2024, 06 pages.

"How to know azure open ai model deployments stored in cpu or gpu?", Retrived from internet URL: https://learn.microsoft.com/en-us/answers/questions/1355036/how-to-know-azure-open-ai-model-deployments-stored, Aug. 30, 2023, 03 pages.

"Quickstart—Get started using Provisioned Deployments with Azure OpenAI Service—Azure OpenAI Service ¦ Microsoft Learn", Retrived from internet URL: https://web.archive.org/web/20240529052116/https://learn.microsoft.com/en-us/azure/ai-services/openai/how-to/provisioned-get-started, May 29, 2024, 08 pages.

International Search Report and Written Opinion received for PCT Application No. PCT/US2025/018047, mailed on Jun. 11, 2025, 12 pages.

International Search Report and Written Opinion received for PCT Application No. PCT/US2025/018051, mailed on Jun. 13, 2025, 17 pages.

International Search Report and Written Opinion received for PCT Application No. PCT/US2025/018048, Jun. 20, 2025, 14 pages.

Kaddour, et al., "Challenges and Applications of Large Language Models", arXiv:2307.10169v1, Jul. 19, 2023, 72 Pages.

Roach John, "How Microsoft's bet on Azure unlocked an AI revolution", Retrieved from internet URL: https://news.microsoft.com/source/features/ai/how-microsofts-bet-on-azure-unlocked-an-ai-revolution, Mar. 13, 2023, 12 pages.

Sivakumar, Shanmugasundaram, "Performance Optimization of Large Language Models (LLMs) in Web Applications", International Journal of Trend in Scientific Research and Development (IJTSRD), vol. 8, No. 1, Jan.-Feb. 2024, pp. 1077-1096.

Sun, et al., "A Multi-dimensional Evaluation of Tokenizer-free Multilingual Pretrained Models", arXiv:2210.07111v1, Oct. 13, 2022, 10 Pages.

Talamadupula, Kartik, "A Guide to LLM Inference Performance Monitoring", Retrieved from Internet https://symbl.ai/developers/blog/a-guide-to-llm-inference-performancemonitoring/, Apr. 3, 2024, 11 Pages.

Agarwal, et al., "LLM Inference Performance Engineering: Best Practices," Databricks, Oct. 12, 2023, 18 pages.

Non-Final Office Action mailed on Jun. 17, 2026, in U.S. Appl. No. 18/652,461, 06 pages.

Non-Final Office Action mailed on Jul. 23, 2026, in U.S. Appl. No. 18/652,420, 52 Pages.

* cited by examiner

UTILIZATION-BASED RESOURCE ALLOCATION IN MODEL-AS-A-SERVICE PLATFORM

BACKGROUND

A Model as a Service (MaaS) platform is a cloud-based artificial intelligence (AI) platform that provides developers and businesses with access to pre-built machine learning models accessible via application programming interface (API) calls governed by a responsible AI layer. These models can be designed to perform a wide range of AI tasks such as natural language processing (NLP) tasks, computer vision tasks, speech recognition tasks, sentiment analysis tasks, recommendation systems, and anomaly detection. MaaS simplifies the process of integrating AI capabilities into applications, offered as services to business that do not wish to invest extensive time and resources into creating and training AI models from scratch. Model services offered through a MaaS platform may be either pre-trained or, in some cases, allow platform users bring their own data for training and inferencing.

SUMMARY

According to one implementation, a model-as-a-service (MaaS) platform dynamically allocates graphics processing unit (GPU) resources of a shared pool among model pools executing instances of different large language models (LLMs) that generate and process text according to different model-specific tokenization schemes. The MaaS platform includes a metric standardizer that receives, from model providers, model-specific benchmark metrics that define relationships between resource utilization and token processing according to the different model-specific tokenization schemes; receives, from one or more MaaS platform components, token-based job metrics pertaining to LLM processing tasks; and determines, based on the model-specific benchmark metrics and token-based job metrics, a model-agnostic metric with respect to multiple of the model pools. The MaaS platform further includes one or more resource allocation components that dynamically reallocates resources of the pool of GPU resources based on the model-agnostic metric determined for the multiple model pools.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

DETAILED DESCRIPTION

Figure 1:
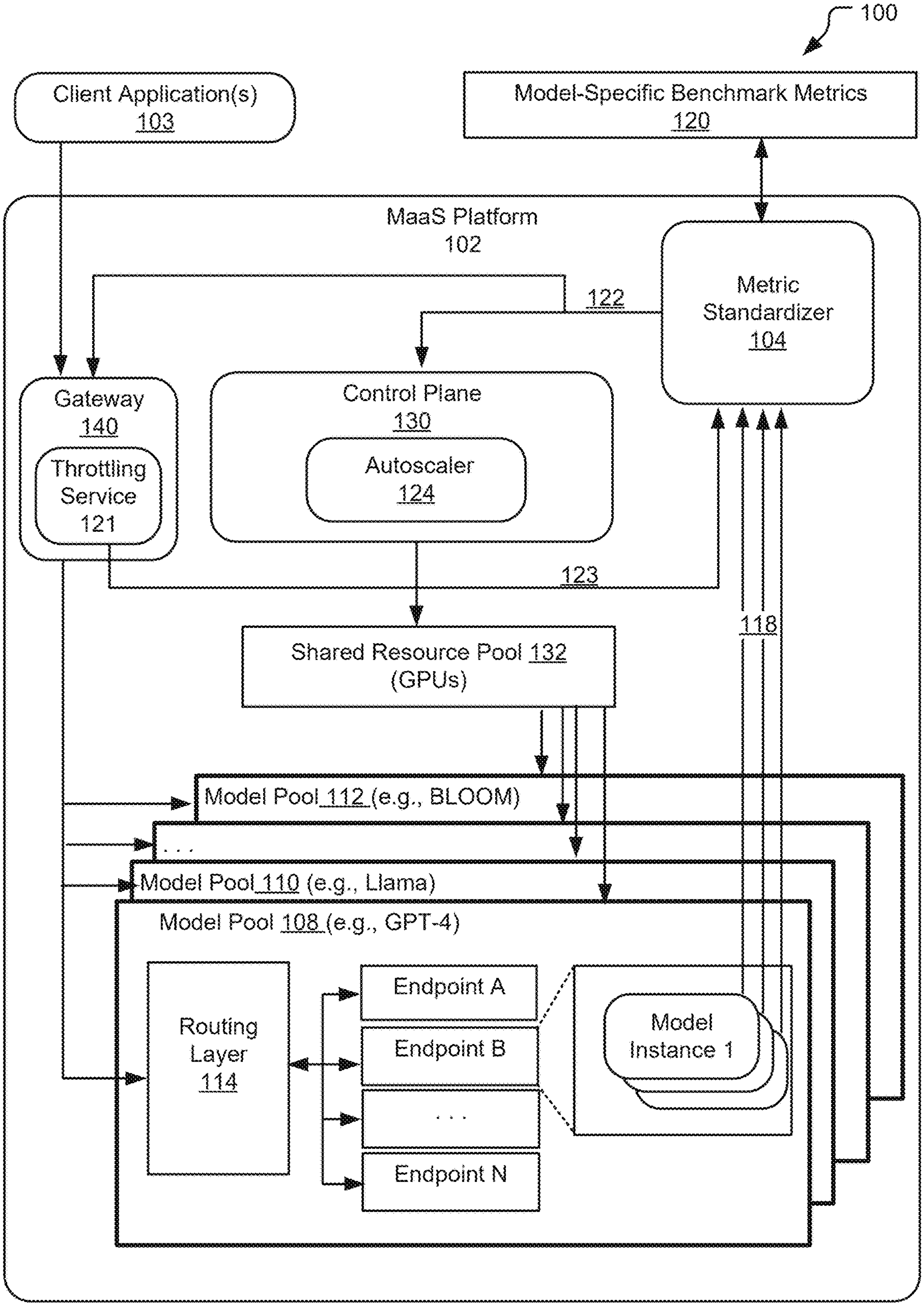
FIG. 1 illustrates an example system that includes MaaS platform that that performs need-based graphics processing unit (GPU) resource allocations based on model-agnostic large language model (LLM) performance metrics generated by a metric standardizer.

The challenges addressed by the herein-disclosed technology arise within a MaaS platform that offers large language models (LLMs) as services that can be configured to perform inferencing on behalf of end customers (e.g., businesses). The MaaS platform provides a GPU capacity to support each model deployed as a service within the platform, and the GPU capacity can be freely allocated in support of different model instances in a manner that is agnostic to identify the models utilizing the capacity. Within this platform, it is desirable to be able to dynamically reallocate GPU resources in response to dynamically-observed changes in model performance. For example, it is desirable to be able to dynamically move resources from a resource pool supporting instances of a first model to a resource pool supporting instance of a second model in response to e.g., the second model is exhibiting increased latencies that exceed a threshold while the first model is exhibiting comparatively low latencies or in response to detecting that the second model is utilizing a quantity of processing resources in excess of a target utilization at a time that the first model is utilizing a quantity of processing resources sufficiently below its own target utilization. When reallocating GPU resources among models, it is also desirable to be able to predict how much compute capacity is going to be gained or lost as a result of a given reallocation.

In current applications, however, it is not possible to easily assess how the latency or resource utilization of different LLM model instances compares to another at a given point in time. Metrics used to quantify LLM utilization and LLM latency tend to be based on customer load, which is measured in terms of "tokens" that are input and output by the LLM in association with concurrently active requests. For example, an LLM's utilization may be measured in terms of total input and output tokens associated with requests processed by a model in a running time interval (e.g., the past 1 minute). LLM latency metrics are similarly token-dependent in that they typically depend upon token generation time, such as the average time it takes to generate a first token in response to query, the average time between the first token and the last token generated in response to a query, or upon the average time between each pair of consecutively-generated tokens. Token-based metrics, such as utilization and latency, cannot be readily compared across models because different models utilize different tokenization schemes.

As used herein, a "tokenization scheme" refers to a tokenization method and vocabulary that affects how an LLM processes and generates text. Each LLM includes a tokenizer (e.g., a software component) that translates natural language text into streams of tokens according to a model-specific tokenization scheme. Tokens are the fundamental unit of text processing for an LLM with each token representing a fragment of language such as am individual word, group of words, portion of a word, or punctuation mark. The tokenization scheme of each different LLM defines how natural language text is to be translated into tokens that the LLM processes (e.g., as inputs) and generates (e.g., as outputs). A pair of LLMs implementing different tokenization schemes may receive an identical input text stream and translate that text stream into token sequences of different length. For example, some tokenization schemes assign one token to each different word while others assign of two or more tokens for certain types of words (e.g., compound words or based on character count) and/or assign tokens to certain types of punctuation marks. Consequently, a given text query such as "what is a nursery rhyme about a lamb?" may be input as 8 separate tokens to one model that uses a first tokenization scheme and as 9 separate tokens to another model that uses a second tokenization scheme (e.g., one that assigns to tokens to punctuation marks). Likewise, there exist scenarios where an identical text string output by two different models is processed as a first number of output tokens according to a tokenization scheme of a first model and a different number of output tokens with respect to the tokenization scheme of another one of the two models.

From the above, it follows that it is difficult to meaningfully compare latency metrics that are based on token count or token generation time. For example, if a given word is represented as one token by a first model and two tokens by another, the "time-to-first-token" latency metric does not represent a time needed to generate equivalent text fragments even in instances where the two models ultimately output identical text strings. Likewise, a latency metric representing average time between tokens can differ in instances where two models take the same amount of total time to generate identical output text strings that correspond to different numbers of tokens.

In addition to potentially assigning different numbers of tokens to identical text strings, the memory consumed during processing of a single individual token can be variable across instances of different models and even across identical models supported by different GPU types. To illustrate the above, assume Model A is deployed in a compute environment with a particular type of GPU and GPU count and has an expected peak utilization at 4 million tokens, meaning that performance of the model is known to decline when actual utilization hits the peak utilization within a given time interval (e.g., 1 minute or 5 minutes). Further assume that Model B has an expected peak utilization of 1 million tokens when deployed in the same compute environment. At times when the utilization of Model A reaches the utilization peak of four million tokens, this does not necessarily correspond to four times the GPU memory utilization observed when Model B hits its utilization peak of 1 million tokens. Likewise, a reallocation of one-quarter of Model A's available compute capacity (e.g., reducing the peak utilization from 4 million to 3 million tokens) does not necessarily double the peak utilization of Model B from 1 million tokens to 2 million tokens.

Due to all of the above, existing measurements of LLM latency and LLM utilization do not facilitate meaningful cross-model comparisons of GPU resource utilization or latency. This creates significant challenges in performing any type of need-based dynamic resource allocation between instances of different, different versions of the same model, or even identical model versions deployed in different GPU architectures.

The herein disclosed technology includes a platform-level metric standardizer that accepts token-based metrics from LLMs and model providers as input and, based on these inputs, generates model-agnostic metrics that facilitate comparisons of metrics quantifying utilization and latency. These model-agnostic metrics provide a basis for performing need-based resource allocation. As used herein, a "token-based metric" is a metric that depends on the tokenization scheme of a given model in the sense that the token vocabulary of the scheme impacts the value of the metric. For example, a token-based metric may be a quantity of tokens, a throughput value identifying a number of tokens processed per interval of time, a measure of token time generation, or even or a memory utilization needed to process a particular token via particular tokenization scheme. Due to the above, two different LLMs utilizing identical quantities of resources may report token-based metrics that quantify their respective resource utilizations in terms of tokens processed, with one LLM reporting a much higher number of tokens processed than the other. Consequently, the token-based measurements of utilization cannot be compared to one another to determine which LLM actually has higher utilization.

In the following description, "LLM" is used to refer to a class of trained models that process and generate tokens that include text (e.g., letters, numbers, symbols). While this class of trained models includes natural language processing (NLP) models, it also includes multimodal models that can receive prompts that include various types of input (e.g., text, image, audio, and/or video data) and likewise generate outputs of various types that are not necessarily the same as the input type. By example, a multimodal LLM trained to perform image alterations may receive as input a user-provided image (e.g., a picture of a panda eating grass) and a user-provided text prompt requesting an image alteration (e.g., "alter this image to show the panda eating bamboo instead of grass"). In response, the multimodal LLM converts the binary pixel values of the image to Base64, which is a group of binary-to-text encoding schemes that transforms binary data into a sequence of printable characters. The LLM then translates the input text string and Base64 image representation into an input token sequence and processes the input token sequence to generate an output token sequence in a manner consistent with traditional LLM that receive and generate natural language text. In this example, the output token sequence includes text of an altered Base64 image representation that can be translated back to binary and displayed as an output image. Examples of publicly-available multimodal LLMs include the Mistral AI model and the large language model Meta AI (LLaMa) model.

Thus, although various examples in the following description primarily pertain to LLMs that receive text strings as input and that generate text strings as output, the herein disclosed technology is contemplated for implementation within a model-as-a-service platform that any type of LLM—including LLMs that receive text, image, audio, and/or video inputs and/or that generate text, image, audio, and/or video outputs.

FIG. 1 illustrates an example system 100 that includes MaaS platform 102 that that performs need-based GPU resource allocations based on model-agnostic LLM performance metrics generated by a metric standardizer 104. During an onboarding process, model service providers on-board their LLMs to the MaaS platform 102. These LLMs are referred to in the following description as "platform LLMs."

During initial configuration, one or more different model pools (e.g., model pools 108, 110, and 112) are configured on behalf of each different one of the platform LLMs. As used herein, the term "model pool" refers to a networked computer system including one or more model endpoints, potentially residing at different geographic locations, that each hosts (executes) one or more model instances of a same model (LLM).

In the example of FIG. 1, the model pool 108 includes multiple endpoints (e.g., Endpoints A-N) each hosting one or more instances of the Generative Pre-Trained Transformer 4 (GPT-4) model; the model pool 110 includes multiple endpoints each hosting one or more instances of the popular Large Language model Meta AI (LLaMA) model; and the model pool 112 includes multiple endpoints hosting instances of the Big Science Large Open-science Open-access Multilingual (BLOOM) model. In one implementation, each of the endpoints within the model pools is created by or on behalf of an end user (e.g., during an initial onboarding configuration process) to be used to perform modeling on behalf of the end user. A gateway 140 of the MaaS platform 100 performs user validation on each incoming request and then forwards each successfully-validated request to the model pool hosting the model type (e.g., GPT-4, Bloom) identified by the request. Each model pool, in turn, includes a routing layer 114 that routes incoming requests to the model endpoints configured on behalf of the requesting user(s) and outgoing requests back to the corresponding user-configured endpoint.

As used herein, a "model endpoint" refers to server hardware, typically implemented on one or multiple virtual machines or servers configured to execute compute logic of a trained machine learning model. In one implementation, a model endpoint includes a collection of logical endpoints corresponding to one or more servers or one or more virtual machines executing on servers at a regional data center that are all configured to execute core logic of a trained machine learning model. In another implementation, a model endpoint includes single instance of a model and the compute hardware supporting execution of that instance.

In one implementation, each of the different model instances (e.g., Model Instance 1) is run inside of a container executing an agent that reports certain token-based job metrics 118 back to the metric standardizer 104. Examples of token-based job metrics 118 include job-specific latency metrics (e.g., quantifying latency of an individual processing job), job-specific utilization metrics (e.g., quantifying resource utilization of an individual job), and token count metrics that quantify the number of input and output tokens processed to answer each received LLM query. The token-based job metrics 118 are metrics quantifying aspects of an individual processing job that are computed based on the tokenization scheme of a given model and that cannot be directly compared across models without some type of normalization to account for the different tokenization schemes (e.g., similar to monetary currencies with a conversion rate). For example, a token-based job metric identifying token counts in an individual processing job (e.g., a number of processing input and/or output tokens) may be understood as "depending on" tokenization scheme of a given model because (as discussed elsewhere herein) identical input/output strings can correspond to different numbers of tokens in different tokenization schemes. Likewise, a token-based job metric quantifying resource utilization of an individual job "depends" on a specific tokenization scheme by quantifying a current memory utilization or a maximum memory utilization in terms of input and output tokens processed by a given model instance. Likewise, a token-based job metric quantifying latency "depends" on a specific tokenization scheme because it is computationally derived based on specific time interval(s) associated with tokens of a given tokenization scheme. For example, common token-based latency metrics include time-to-first-token (TTFT), which measures how fast an LLM can produce the first token in a response, and time-between-tokens (TBT), which measures how consistent an LLM model is in producing tokens at regular intervals.

Notably, the token-specific job metrics 118 (e.g., metrics quantifying utilization in terms of number of tokens processed or latency in terms of tokens token processing time) are not readily compatible across models implementing different tokenization schemes because, as discussed above, different tokenization schemes may use different numbers of tokens to embed identical text strings and also because memory utilization associated with processing of individual tokens varies between models and even between model instances deployed in different memory architectures (e.g., different GPU types).

Figure 2:
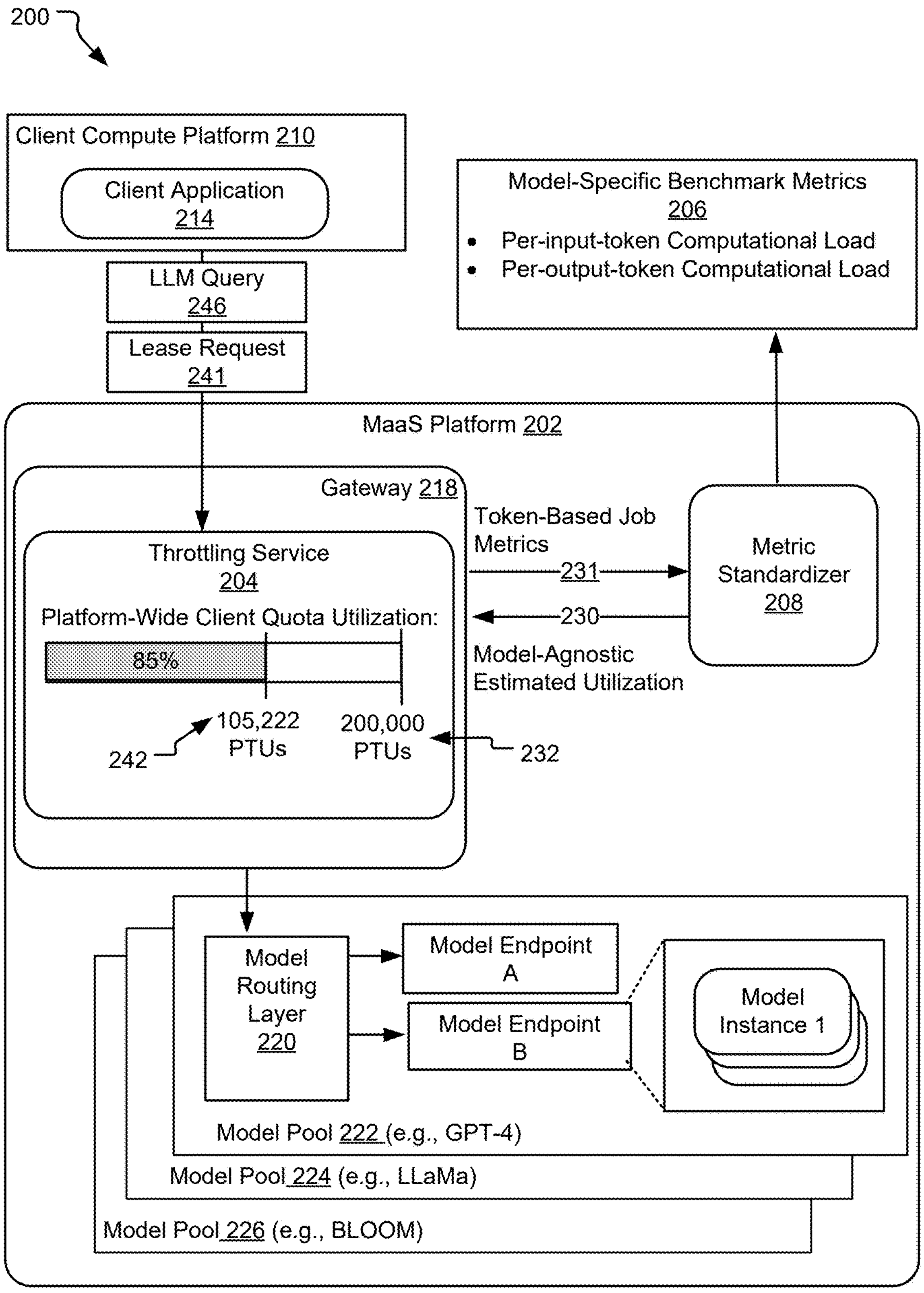
FIG. 2 illustrates another example system including a MaaS platform with a throttling service that throttles incoming LLM processing requests based on model-agnostic metrics generated by a metric standardizer.

In some implementations such as the example explored herein with respect to FIG. 2, the metric standardizer 104 receives other token-based job metrics from other component(s) within the MaaS platform 102, such as a throttling service 121 (shown in gateway 140) that throttles user access to model resources based on assigned customer-assigned quotas. For example, the throttling service 121 is shown conveying convey input/output token counts 123 associated with different LLM processing requests to the metric standardizer 104. The throttling service 121 determines, based on corresponding outputs of the metric standardizer 104, how much of the customer-assigned quota is consumed by each different request granted.

One key function of the metric standardizer 104 is to convert or normalize the token-based metrics (e.g., 118, 123) receiving during active LLM operations into corresponding metrics that can meaningfully be compared across models. This conversion or normalization is facilitated by stored model-specific benchmark metrics 120.

In one implementation, the metric standardizer 104 experimentally determines the model-specific benchmark metrics 120 by performing internal benchmarks and load tests of various models in deployed in different GPU architectures on the MaaS platform. In other implementations, model service providers (not shown) provide some or all of the model-specific benchmark metrics 120 to the MaaS platform 102.

In implementations that perform resource allocation based on resource utilization (e.g., FIGS. 2 and 3), the model-specific benchmark metrics 120 define relationships between resource utilization and token processing according to a specific one of the different model-specific tokenization schemes. The model-specific benchmark metrics 120 are used, by the metric standardizer 104 to determine model-agnostic metrics 122 corresponding to the token-based job metrics 118.

As used herein, the term "model-agnostic metric" refers to a metric presented in terms of a model-agnostic unit type that facilitates direct comparison of the metric across different models and GPU architectures without conversion or normalization. Utilization metrics presented strictly in terms of tokens requested or used are not model-agnostic because, as described above, a same quantity of tokens can correspond to a different quantity of GPU capacity when processed by different models. In contrast, a "model agnostic utilization metric" is a model-agnostic quantification of utilization that can be directly compared for different models without conversion or normalization.

A model-agnostic metric derived with respect to one model instance can be directly compared to the same model-agnostic metric derived with respect to another model instance (e.g., of a different model type and/or different GPU architecture) without performing any interim unit conversion, scaling, or normalization. One example of model-agnostic metric is a "provisioned throughput unit (PTU)," which is described in detail with respect to FIG. 2 and also referenced with respect to FIG. 3 Another example of a model-agnostic metric is a latency metric that has been normalized across different tokenization schemes, as is discussed with greater detail with respect to FIG. 4.

In various implementations, the model-agnostic metrics 122 generated by the metric standardizer 104 are used to ways to facilitate different types of shared resource allocation. In an implementation discussed herein with respect to FIG. 2, the gateway 140 provides the metric standardizer 104 with token-based usage requests that define requested quantities of model tokens in association with specific model instances. The metric standardizer 104 translates each of the token-based usage requests into a corresponding model-agnostic utilization metric representing a quantity of units of a model-agnostic unit type (e.g., a quantity of GPU capacity) that is needed to process the corresponding token-based usage request. The model-agnostic utilization metric computed for each processing request is usable by the MaaS platform 302 to directly compare the size of different processing requests to one another and to perform centralized, model-agnostic request throttling to enforce memory utilization quotas that can be used can be used across the different platform LLMs. For example, an end user subscribes to a single compute quota tracked in terms of a model-agnostic unit of compute capacity (e.g., PTUs) that can be redeemed for compute tasks performed by any or multiple of the different platform LLMs. This example is discussed and elaborated on in detail with respect to FIG. 2.

Figure 3:
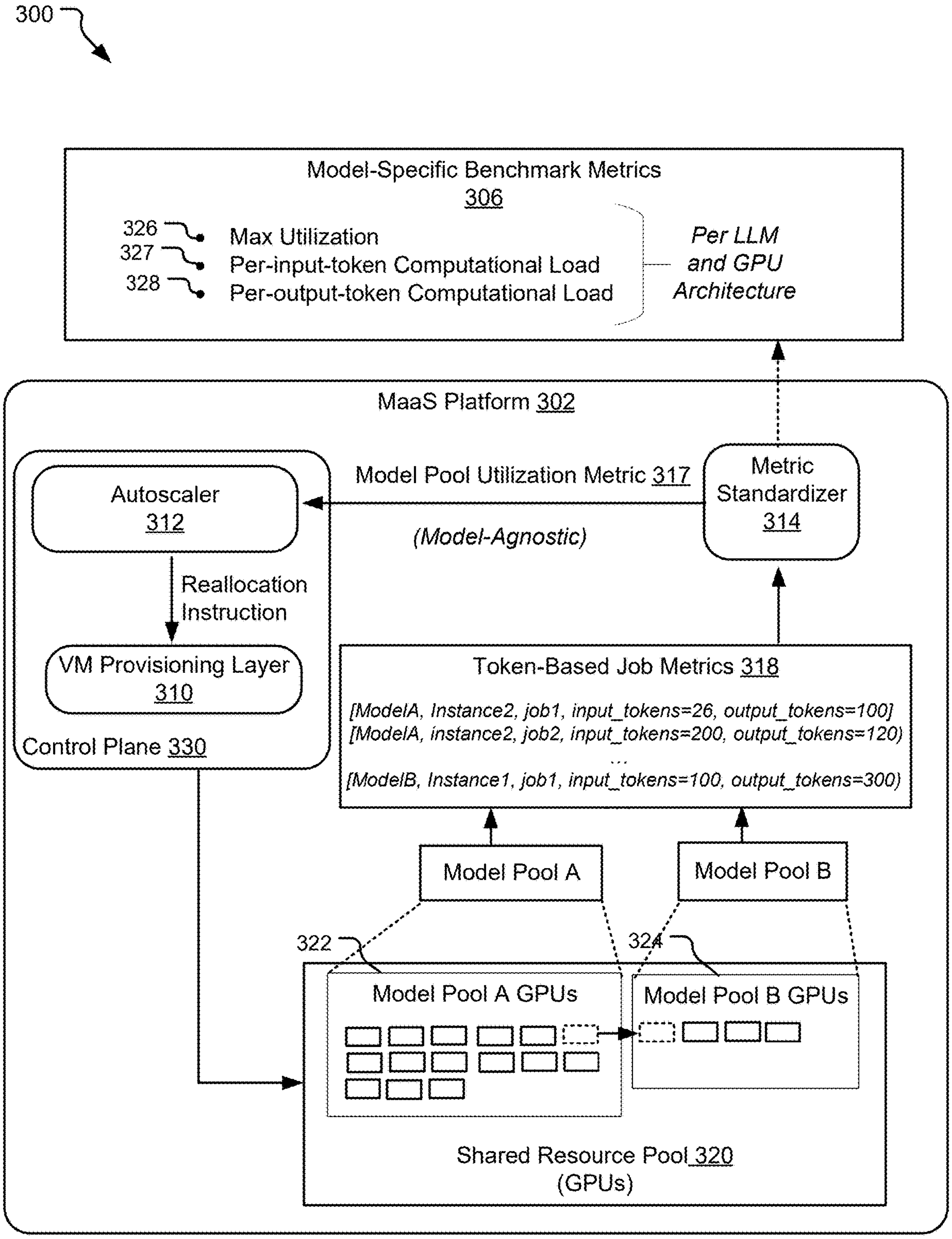
FIG. 3 illustrates still another example system including a MaaS platform that dynamically allocates GPU resources of a shared resource pool among various model pools based on model-agnostic performance metrics generated by a metric standardizer.
Figure 4:
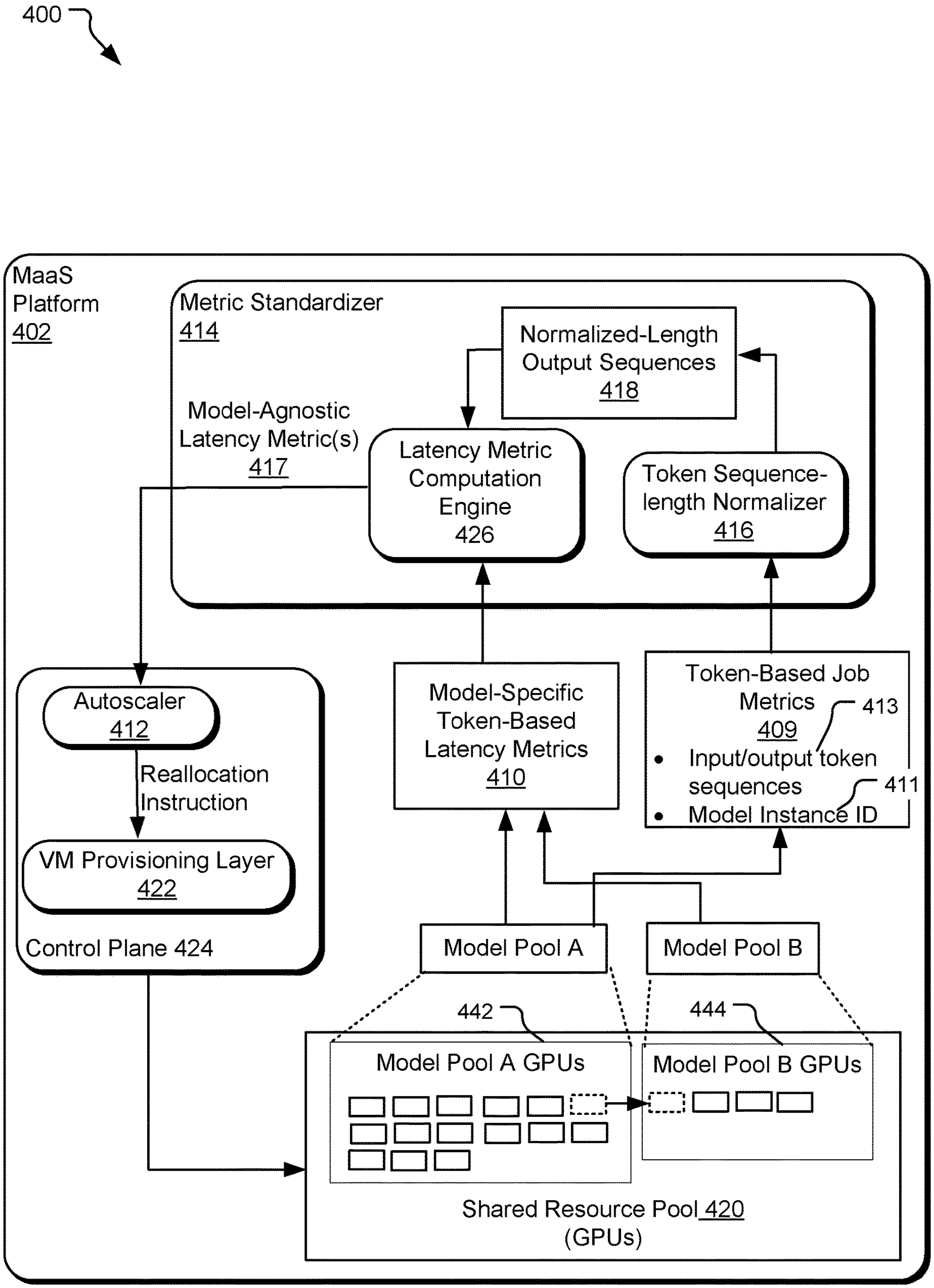
FIG. 4 illustrates yet another example system including a MaaS platform that dynamically reallocates GPU resources of a shared resource pool among various model pools based on model-agnostic performance metrics generated by a metric standardizer.

In other implementations discussed herein with respect to FIG. 3-4, the model-agnostic metrics 122 include model-agnostic performance metrics (e.g., utilization or latency metrics) provided to an autoscaler 124 that resides in a control plane 130 of the MaaS platform 102. The autoscaler 124 automatically scales up the number of GPU resources allocated from the shared resource pool 132 to a given model pool (e.g., the model pool 108) in response observing certain model behaviors, such as increased latencies or high utilizations of GPU resources currently allocated to the model pool. In some implementations, dynamic "up-scaling" of GPU resources is achieved by down-scaling (removing) GPU resources allocated to other model pools in the MaaS platform 102.

FIG. 2 illustrates another example system 200 including a MaaS platform 202 including a throttling service 204 that throttles incoming LLM processing requests based on model-agnostic metrics generated by a metric standardizer 208. The MaaS platform 202 includes a number of architectural software components the same or similar to those described with respect to FIG. 1, including various model pools 222, 224, and 226 each supporting a different LLM. Each model pool includes a model routing layer 220 for routing requests within the pool to a select model endpoint (e.g., Model Endpoint B), and the model endpoints each, in turn, route incoming requests to corresponding model instances hosted by the model endpoints.

Each LLM processing request received at the MaaS platform 202 is directed to a gateway 218 that acts as the "front door" to the respective model pools. The gateway 218 includes the throttling service 204, which functions to limit the number of LLM processing requests that each user endpoint (e.g., client application 214 on client compute platform 210) can make to the various model pools in a certain period of time. Although throttling services are common in cloud-based shared resource systems, throttling services for LLMs are typically token-based. In such a system, a user pays for a subscription to a cloud-based model (e.g., a single LLM) and the user is granted a set quota of tokens that can be redeemed with the LLM service in a running interval of time, such as 10,000 tokens each minute.

The GPU capacity required to process an individual token is highly variable across models, different versions of the same model, and across identical model versions deployed in different GPU architectures. Consequently, a quota limit of 10,000 tokens corresponds to a finite and equivalent memory utilization cap exclusively among users submitting workloads with identical characteristics to the same model instance or identical versions of a model deployed in identical GPU architectures. If tokens of these existing LLM throttling services were to be redeemable in exchange for processing tasks performed by different models, different users subscribed to the same quota limit would be allotted very different quantities of total compute capacity as a consequence of model choice. For example, it may be that 10,000 tokens corresponds to 5GG of memory per minute for a first model and the same 10,000 tokens corresponds to 12 GB of memory per minute for a second model.

To prevent the forgoing inequalities in quota management and, to some degree, inefficiencies in processing and compute management, the metric standardizer 208 of the MaaS platform 202 converts token-specific memory utilization requests (e.g., an example set of token-based job metrics) to a model-agnostic units that quantify memory utilization. This is facilitated, in part, by intelligent derivation and use of model-specific benchmark metrics 206 that define relationships observed between resource utilization and token processing according to the different tokenization schemes of different LLMs deployed in different GPU architectures.

In one implementation, model service providers provide the model-specific benchmark metrics 206 to the metric standardizer 208 in association with their respective model services and various different types of GPU architectures that may be deployed to execute those services. In other implementations, the metric standardizer 208 experimentally derives the model-specific benchmark metrics 206 by performing load testing in association with various internally-tracked benchmarks. For example, testing is performed to quantify, for each model deployed in each different GPU architecture, the computational loads incurred when processing workloads with different characteristics (e.g., different number of input tokens and output tokens).

According to one implementation, the model-specific benchmark metrics 206 include information (e.g., models, look-up tables) that defines or is usable to derive a computational load that is incurred when processing a select a workload with known input/output characteristics by a specific LLM deployed in a given GPU architecture. As used herein, the term "computational load" refers to a measurement of memory and compute utilization incurred to process a given workload load of a given workload shape and with a selected degree of concurrency. In FIG. 2, the model-specific benchmark metrics 206 are shown as storing a per-input-token computational load 244 for each individual input token in a given workload and a per-output-token computational load 246 for each individual output token in a workload, both of which are derived in terms of model-agnostic units.

In one implementation, a different set of the model-specific benchmark metrics 120 are stored with respect to each model supported on the platform and each supporting different GPU architecture. For example, the model-specific benchmark metrics 206 may include a first set of metrics usable to determine computational load incurred by processing any individual token by an instance of GPT-4 model executing on a single NVIDIA 8100 GPU chip while also providing other sets of the same model-specific benchmark metrics 206 for alternative GPU architectures supporting the same model.

Depending upon predetermined acceptable error margins for estimating computational load for different use cases, the per-token computational loads (244, 246) may be derived, in different implementations, with different degrees of granularity. For many LLMs, input tokens have a significantly lower associated computational load than output tokens; thus, it may be more accurate to estimate the computational load for input tokens and output tokens separately. In one such implementation, the per-input-token computational load 224 is assumed to be equal for all input tokens of a given workload and the per-output-token computational load 244 is assumed to be equal for all output tokens of a given workload.

Although computational load can vary based on token length (e.g., number of characters in a given word), these length-based variations are smaller with respect to tokens of a same type (e.g., input v. output) and thus may, for purposes of service throttling, be treated equivalently in some scenarios without introducing significant variations in the total quantities of memory that each different user is permitted to utilize. Still, in some implementations, the per-token computational loads (244, 246) are determined based on characteristics of individual input tokens and output tokens within a workload. For example, the model-specific benchmark metrics 206 specify that input tokens of a first token index have a first computational load while input characters of another token index (e.g., of a different tokenization scheme) have a second computational load, and/or provide other types of rules from which per-token computational load can readily be determined.

By example, one implementation of the disclosed technology derives computational load for each workload in terms of a model-agnostic unit referred to herein as a "Provisioned Throughput Unit" (PTU). The PTU is defined, by the Maas Provider, to represent a unit of token throughput that can be used to facilitate comparison of GPU utilization across models. The PTU represents a logical unit of GPU capacity, but the number of PTUs corresponding to a given GPU type (e.g., chip type) is not constant. Rather, the amount of throughput in each PTU is defined on a per-workload basis and in relation to the maximum token throughput supported by the LLM and GPU architecture being used to process this workload.

Notably, a GPU supporting a given LLM devotes some GPU capacity to storing the LLM and a remaining portion of the GPU capacity is then available to support processing operations of the model. The PTU corresponds to a fraction of the above mentioned "remaining portion of the GPU capacity" that is available to support token throughput in a given model deployment. This capacity is defined in terms of an experimentally-determined "maximum token throughput" (also referred to herein as the max utilization), which is the maximum token throughput that can be devoted to workload processing for a specific model instance without compromising the quality or speed of token generation. In one implementation, the PTU is defined to equal a fixed percentage of a max token throughput, also referred to herein as "max utilization" of a given workload.

The max token throughput or max utilization for a select workload describes a maximum quantity of memory that can be allocated to processing for a specific model instance (e.g., defined by LLM and GPU architecture) while that specific model instance is executing a plurality of workloads with characteristics substantially similar to the select workload without compromising the quality or speed of token generation. Notably, maximum token throughput for a workload depends upon many factors including (1) the LLM processing the workload and the LLM's tokenization scheme; (2) the underlying GPU hardware supporting the LLM including the GPU type and count; and (3) size characteristics of the workload including the number of input tokens and the number of output tokens. Due to the above, the maximum token throughput is highly variable, even between workloads of a same model. However, given various assumptions about the characteristics of the workloads being processed, is possible to statistically model the maximum token throughput for a given LLM and GPU architecture.

In one implementation, the max token throughput of a workload is identified by identifying and referencing a relevant stored probability distribution from a plurality of pre-generated and stored probability distributions. The "relevant" probability distribution for a select workload is, for example, a probability distribution modeling a max utilization ("max token throughput") that includes throughput measurements collected during processing of workloads of similar input/output size by an LLM and GPU architecture corresponding to the target instance (e.g., a same LLM as the target instance deployed within a same GPU architecture as the target instance). For example, a first probability distribution for a given LLM and supporting GPU architecture is generated by (1) executing the LLM on a first concurrent set of a workloads characterized by a common set of input/output characteristics (e.g., all consist of 100 input tokens and 500 output tokens); (2) recording the max throughput observed before performance of the model starts to degrade; and (3) repeating the experiment (e.g., by re-observing max throughput for the same model while concurrently processing other workloads characterized by the same input/output characteristics) a statistically significant number of times. Additional probability distributions are generated for the same LLM and GPU architecture by repeating steps 1-3 above with respect to workloads characterized by different sets of input/output characteristics (e.g., workloads consisting of 50 input tokens and 300 output tokens; 100 input tokens and 100 output tokens; any other input/output-length combination). In this way, a plurality of probability distributions can be generated for each LLM and supporting GPU architecture, with each individual one of the probability distributions being usable to identify max token throughput that is probabilistically expected when the LLM is being used to concurrently process a set of workloads characterized by a known input token sequence length and known output token sequence length.

As stated above, the PTU is, in one implementation, defined to equal a fraction of the observed max utilization ("max token throughput") that is determined (per the above-described methodology) to be relevant to a given workload. For example, the size of the PTU is, for a given workload, set to equal 1% of the max token throughput that is identified, from the stored probability distributions, as being relevant for that workload. Depending upon the type of LLM, the supporting GPU architecture, and workload characteristics of the model, 1 PTU equaling a fixed 1% of max utilization can correspond to highly variable units of token throughput—e.g., 1000 tokens/see or 100 tokens/see on average, with this throughput being split across prompt tokens and generations tokens that are respectively processed according to different throughput rates. It follows from the examples above that the PTU represents a unit of definite bounds that is workload-specific. Consequently, an individual PTU corresponds to a quantity of tokens that varies based on identify of a target LLM for an incoming customer-requested LLM processing task, the GPU architecture supporting the target LLM, and even the characteristics of the workload.

In one implementation that utilizes PTU as a model-agnostic utilization metric type, the model-specific benchmark metrics 206 include modeled data describing probability distributions of max token throughput that are available per model instance running on various different GPU architectures. Each probability distribution corresponds to token throughputs in association with a specific LLM and GPU architecture during processing of workloads identified by certain common input/output characteristics (e.g., input token length and output token sequence length). Thus, for any given model, GPU architecture, and workload scenario with known input/output characteristics, it is possible to utilize the model-specific benchmark metrics 206 to identify a corresponding max token throughput (from a corresponding stored probability distribution), and to further determine the fraction of the max token throughput represented by the workload, which can then be translated to a quantity of PTU. Further, by defining the PTU based on max utilization, it becomes possible to use stored workload models and the max token throughput of those stored models as a way of defining the PTU on a per-workload basis. This, in turn, makes possible to directly compare the quantities of compute capacity utilized across different LLMs deployed in different GPU architectures.

In the example of FIG. 2, the throttling service 204 functions to limit a number of requests that a user can concurrently submit to the instances of the different LLMs based on a customer-allotted quota 232, which is defined in units of a model-agnostic unit type. The units of the customer-allotted quota are redeemable, through the throttling service 204, in exchange for compute tasks performed by the different LLMs. For example, a customer can subscribe to a single quota and concurrently submit processing requests to different LLMs, with each request deducting a corresponding quantity of units for the single quota. In one implementation, the throttling service 204 manages and tracks a "current resource utilization" for each different customer endpoint (e.g., the client application 214) in terms of the PTUs with each customer being allotted a set maximum quantity of the provisioned throughput units without a unit of time, such as a minute, five minutes, or other time period. In other implementations, other model-agnostic units of GPU capacity are used instead of the PTU.

The throttling service 204 receives token-based memory utilization requests and communicates with the metric standardizer 208 to determine, for each token-specific request, a corresponding estimated utilization 230 representing a determined computational load of the associated workload. Based on the estimated utilization 230, the current resource utilization determined for each customer endpoint, and the customer-allotted quota 232—all determined in model-agnostic units, the throttling service 204 determines whether to grant or deny each new LLM processing request.

In FIG. 2, the client application 214 generates an LLM query 245 for submission to a target model instance in the model pool 222. The client application 214 further generates a lease request 241 and submits the lease request to a gateway 218. The lease request 241 functions to reserve resources in the model pool 222 to process the LLM query 245. The lease request 241 identifies the target model instance (e.g., by specifying a specific model pool, endpoint, instance ID, or other identifying information) and further specifies a requested quantity of input tokens and a requested quantity of output tokens, where the requested quantity of output tokens places a cap on the number of output tokens that the corresponding model instance is permitted to generate. The input token count and the output token count in the lease request 241 are determined according to the specific tokenization scheme of the corresponding target model instance as well as based on the text of the LLM query 246.

Prior to determining whether to grant the lease request 241, the throttling service 204 conveys token-based job metrics 231 to the metric standardizer 208. The token-based job metrics 231 include the identifier for the target model instance and the requested input/output token counts. The metric standardizer 208 uses the token-based job metrics 231 to determine a model agnostic utilization metric, shown in FIG. 2 as "estimated utilization 230." The estimated utilization 230 represents an estimated total computational load associated with the LLM query 246 that is given in terms of a model-agnostic unit type. In one implementation, the estimated utilization 230 is determined, by the metric standardizer 208, as a quantity of the provisioned throughput units (PTUs).

The throttling service 204 next determines a current utilization 242 of the user. In one implementation, the current utilization 242 represents a net resource utilization associated with LLM processing requests originating at the client compute platform 210 in a recent period of time, such as the last 1 minute or 5 minutes. The current utilization 242 is determined in terms of model-agnostic units of token throughput, such as PTUs (as defined above).

In one implementation, the throttling service 204 dynamically determines the current utilization 242 of the customer endpoint by querying a platform-level database (not shown) to retrieve model-agnostic utilization metrics (e.g., in PTUs) for the recent time interval that quantify total utilization of the customer over the recent time interval. For example, the platform-level database stores model-agnostic utilization metrics that are published by the metric standardizer 208 based on token-based job metrics that the individual model instances report back to the metric standardizer 208 (see, e.g., the token-based job metrics 318 discussed with respect to FIG. 3, below). For example, the model instances transmit reports indicating number of input tokens and output tokens processing on behalf of each customer endpoint, and the metric standardizer 208 converts these token-based job metrics to model-agnostic utilization metrics (e.g., PTUs utilized per job and per model instance) that are, in turn, published to the platform-level database. In another implementation, the throttling service 204 self-determines the current utilization 242 for each of the customer endpoints without reference to a platform-level database, such as by storing and aggregating utilization information included within response packet headers received at the gateway 218 in associated with each submitted LLM processing job.

The throttling service 204 limits a number requests a user can concurrently submit to the instances of the different LLMs based on the current utilization 242 of the customer, the model-agnostic estimated utilization 230, and the customer-allotted quota 232, all of which are defined in terms of units of the model-agnostic unit type. Specifically, the throttling service 204 determines whether the sum of the current utilization 242 and the estimated utilization 230 would, if utilized by the customer, exceed the customer-allotted quota 232. If so, the throttling service 204 denies the lease request 241 and the client application 214 queues the request for resubmission at a later time. Otherwise, the throttling service 204 grants the request, and instructs the gateway 218 to process the LLM query 246 associated with the lease request 241.

FIG. 3 illustrates another example system 300 including a MaaS platform 302 that dynamically allocates GPU resources of a shared resource pool 320 among various model pools (e.g., model pool A, model pool B) based on model-agnostic performance metrics generated by a metric standardizer 308. The MaaS platform 302 includes a number of architectural software components the same or similar to those described with respect to FIG. 1 and FIG. 2, including model pools (e.g., model pool A, model pool B) that each execute various instances of a corresponding LLM deployed at one or multiple endpoints. A different LLM is supported by each of the model pools. The model instances within the model pools are executed by GPU resources that belong to a shared resource pool 320. In FIG. 3, the MaaS platform 302 further includes a control plane 330 with an autoscaler 312 that dynamically reallocate resources of the shared resource pool 320 among the model pools.

By example, FIG. 3 illustrates two model pools-Model Pool A and Model Pool B. Model Pool A includes instances of a first LLM (Model A) while Model Pool B includes instances of a second, different LLM (Model Pool B), where Model A and Model B utilize different tokenization schemes. At a time corresponding to a resource allocation shown in FIG. 3, a first subset 322 of resources from the shared resource pool 320 have been allocated to support the instances of Model A while a second subset 324 of resources from the shared resource pool 320 have been allocated to support the instances of Model Pool B.

In one implementation, each of the model instances executes within a container that reports token-based job metrics 318 to the metric standardizer 314. In the example shown, each set of the token-based job metrics 318 identify, for each of multiple processing jobs, a corresponding model and model instance, as well as a total number of input tokens and outputs tokens processed by the model instance during corresponding job. Although not shown in FIG. 3, the token-based job metrics 318 may, in some implementations, identify specific text strings input and output during each processing job in addition to and/or in lieu of input/output token counts. For example, upon completion of each processing job, the model instances transmit a report to the metric standardizer 314 that identifies the model instance, input token sequence, and output token sequence generated in response to processing of the input token sequence.

It is assumed that, upon initialization of each new model instance within the MaaS platform 302, the metric standardizer 314 receives an identifier for the new model instance and a description of the GPU architecture that the new model instance is running on. Thus, given a unique model instance identifier (e.g., the model identifier—"Model A"—paired with an instance identifier—"Instance2") for a set of the token-based job metrics 318, the metric standardizer 314 can identify the specific GPU architecture (e.g., type and number of GPUs) currently being used to execute the corresponding model instance. This capability allows the metric standardizer 314 to identify applicable sets of model-specific benchmark metrics 306 usable to compute a memory utilization in units of a model-agnostic unit type for each individual one of the processing jobs reported in the token-based job metrics 318. The model specific benchmark-metrics 306 define relationships observed between resource utilization and token processing according to the different tokenization schemes of different LLMs deployed in different GPU architectures. In one implementation, the model-agnostic unit type is a PTU, as described above with respect to FIG. 2.

In the implementation shown, the model-specific benchmark metrics 306 are derived by the metric standardizer 314 based on load testing performed with respect to various internally-defined benchmarks. The model-specific benchmark metrics 306 are, in one implementation, stored in a platform-managed database for repeated look-up and use in generating model-specific utilization metrics to model-agnostic utilization metrics. The model-specific benchmark metrics 306 include information usable to convert the token counts provided in the token-based job metrics 318 to model-agnostic utilization metrics that can readily be compared across models. In one implementation, the model-agnostic utilization metrics are generated in a model-agnostic unit representing a quantity of token throughput. The PTU, described above, is one example of a model-agnostic unit type. In one implementation, the model-specific benchmark metrics 306 include different sets of the model-specific benchmark metrics 306, with each set being applicable to a specific LLM and a supporting GPU architecture that can be deployed to support the LLM.

In the illustrated implementation, each set of the model-specific benchmark metrics 306 is specific to a model instance defined by an LLM identifier and a select supporting GPU architecture. Further, the model-specific benchmark metrics 306 are shown as storing information that includes, or that is usable to derive, a per-input-token computational load 327 for each individual input token in a given workload and a per-output-token computational load 328 for each individual output token in a workload, both of which are derived in terms of model-agnostic units representing GPU capacity (e.g., PTUs as described elsewhere herein). In other implementations, the model-specific benchmark metrics 306 store information usable to derive the computational load of a workload as a whole but not necessarily the computational load of individual tokens within the workload. The derivation of the per-input-token computational load 327 and per-output-token computational load 328 for each individual output token are, in one implementation, defined at the workload level in a manner the same or substantially similar to that described with respect to FIG. 2.

The model-specific benchmark metrics 306 further defines information for determining a max utilization 326 associated with each individual workload processed. The max utilization 326 (also referred to elsewhere herein as a "max token throughput") describes a max quantity of memory that can be devoted to processing for a specific model instance (e.g., defined by LLM and GPU architecture) without compromising the quality or speed of token generation. In one implementation, the max utilization 326 can vary depending on workload characteristics such as input prompt length and number of tokens generated. As such, the max utilization 326 for a given workload may be determined based on simulations run for workloads identified as similar to those of the incoming customer-requested LLM processing task (e.g., workloads that the same or similar numbers of input and output tokens).

Other aspects of the model-specific benchmark metrics 306 not specifically defined with respect to FIG. 3 may be assumed to be the same or similar to those described with respect to the model-specific benchmark metrics 206 of FIG. 2.

By aggregating the max utilization 326 corresponding to the different workloads of a given model instance, the metric standardizer 308 computes a max utilization for each model instance. It is assumed that GPU allocation within each of the model pools (e.g., Model Pool A and Model Pool B) is performed by a suitable load balancing algorithm. For example, the load balancing algorithm ensures that the resources within the subset 322 are distributed fairly, based on load, to active model instances in Model Pool A. Due to this load balancing, the various model instances within a Model Pool have respective max utilizations that are relatively close to one another (e.g., within +/−10% or some other known deviation). The Max Utilization for an individual model pool-referred to herein as the "Max Pool Utilization" is therefore, in one implementation, selected to be equal to the max utilization of the model instance within the pool with the greatest peak load.

In one implementation, the above-described Max Pool Utilization that is derived for each model pool is used as a basis (e.g., trigger point) for dynamically up-scaling and down-scaling GPU resources allocated to the model pool, as is discussed in further detail below.

For each processing job identified within the token-based job metrics 318, the metric standardizer 314 selects a relevant subset of the model-specific benchmark metrics 306 (e.g., metrics derived based on an LLM and GPU architecture matching the model instance that executed the processing job). The selected relevant subset of the model-specific benchmark metrics 306 are used to determine a computational load of the corresponding processing job in terms of units of a model-agnostic unit type (e.g., PTUs).

In one implementation, the above-described computational loads computed for different processing jobs of a model instance are aggregated together to derive a model instance utilization metric quantifying GPU utilization of the model instance within a recent time interval (e.g., the past one minute). The model instance utilization metrics determined for different model instances within each pool are then combined to derive a model pool utilization metric 317 for each model pool. The model pool utilization metric 317 quantifies resource utilization for a model pool as a whole. For example, the model pool utilization metric 317 represents the total GPU utilization of Model Pool A in the last 1 minute.

In one implementation, the model pool utilization metric 317 is defined as a quantity of PTUs. For example, model pool utilization metric 317 represents a quantity of the PTUs collectively utilized by all processing jobs in all model instances of Model Pool A over the previous one-minute interval. In another implementation, the model pool utilization metric 317 is given as a percentage of the max pool utilization (defined above) for the corresponding model pool. For example, the model pool utilization metric 317 for Model Pool A may be determined as "79% of the max pool utilization of Model Pool A (with Max Pool Utilization derived as described above).

In FIG. 3, the autoscaler 312 performs dynamic resource allocation by adding GPU resources to and/or removing GPU resources from the subsets 322 and 324 of GPUs allocated to each of Model Pool A and Model Pool B, respectively, in response to observed changes in the model pool utilization metric 317 for each pool that satisfy predefined scaling criteria.

In one implementation, the autoscaler 312 performs resource allocation with the objective of ensuring that the model pool utilization metric 317 for each model pool remains within a threshold target range defined relative to the corresponding max pool utilization determined for same model pool. For example, the autoscaler 312 may implement logic ensuring that Model Pool A is using-on average-between 75% and 85% of the max pool utilization determined with respect to Model Pool A for a recent time interval (the past 1 minute or 5 minutes). In this example, "scale-down" criteria is satisfied when the Model pool utilization metric 317 of the subset 322 drops below 75% of the determined max pool utilization for Model Pool A for a threshold period of time (e.g., 30 minutes). Likewise, in this same example, "scale-up" criteria are satisfied when the model pool utilization metric 317 of the subset 322 allocated to Model Pool A equals or exceeds 85% of the determined max pool utilization for Model Pool A.

In one implementation, GPU resources are dynamically allocated—meaning, at the time those resources become needed—and/or removed from the subsets 322 and 324 in finite, static incrementations. For example, a set number of GPUs is added to the subset 322 each time the autoscaler 312 elects to "scale-up" GPU resources in the subset 322 and the set number of GPUs is subtracted from the subset 322 each time the autoscaler 312 elects to "scale-down" the GPU resources in the subset 322. In this implementation, resource are scaled up/down in static step-like increments and each increment is triggered when the autoscaler 312 "observes" a value of the model pool utilization metric 317 that satisfies the predefined scale-up or scale-down criteria.

In one implementation, the subsets 322 and 324 of GPU resources are made available to the corresponding model pools within a memory map that is used by each model pool. In this case, the autoscaler 312 "scales-down" a model pool by instructing a VM provisioning layer (not shown) to remove a subset of GPU resources from a memory map logical addresses utilized by the model pool. Likewise, the autoscaler 312 "scales-up" a model pool by instructing the VM provisioning layer to add a subset of GPU resources to the memory map used by the model pool. In implementations where resources are dynamically re-allocated between model pools, the autoscaler 312 may dynamically allocate the GPU resources by removing a subset of GPU resources from a memory map utilized by a first model pool and by adding the subset of GPU resources to a memory map utilized by a second model pool.

In other implementations, GPU resources are allocated among the model pools in increments that are variable and determined to specifically satisfy discrete and specific utilization target(s). For example, the autoscaler 312 receives the model pool utilization metric 317 as a percentage of the max utilization for model pool A and determines a specific scale-up or scale-down increment that suffices to cause the model pool utilization metric 317 to equal a set target percentage of the max utilization for model pool A.

In FIG. 3, the MaaS platform 302 is further shown to include a virtual machine (VM) provisioning layer 310 that implements GPU reallocation instructions from the autoscaler 312. If, for example, the autoscaler 312 provides the VM provisioning layer with a reallocation instruction identifying a specific quantity and/or type of GPUs to move from the subset 322 (in support of Model Pool A) to the subset 324 (in support of Model Pool B). In response, the VM provisioning layer 310 identifies VMs currently configured to utilize the subset of resources 322 and reconfigures those VMs as appropriate to affect the requested GPU reallocation. For example, the VM provisioning layer 310 implements a "scale-down" reallocation instruction by reducing the size of a GPU memory footprint available a given VM (e.g., by removing logical addresses allocated to a VM and/or from a memory map that maps those logical addresses to physical addresses) to and/or by remapping the logical memory assigned to VM to exclude certain GPU resources from the memory map of logical-to-physical GPU addresses that is used by the VM. In some cases, the VM provisioning layer 310 implements a "scale-down" reallocation instruction by spinning down one or more VMs, thereby reducing a total number of VMs executing on behalf of a given model pool.

Similar to the above, the VM provisioning layer 310 may implements "scale-up" reallocation instructions that increase a size of a GPU memory footprint available to a given VM and/or by remapping the GPU memory available to the VM so as to include certain additional (reallocated) GPU resources in the new logical-to-physical memory mapping. These "spin-up" instructions may entail provisioning one or more additional VMs and configuring those VMs to support containers that execute instances of the associated model pool.

Due to the collection and storage of the model-specific benchmark metrics 306, the metric standardizer 314 can support dynamic cross-model resource allocations in response to dynamically observed performance metrics (e.g., the model pool utilization metric 317) for each model pool. Because these performance metrics are—for the first time—model-agnostic, the autoscaler 312 can compute specific resource allocations effective to achieve target utilizations within each model pool.

FIG. 4 illustrates another example system 400 including MaaS platform 402 that dynamically reallocates GPU resources of a shared resource pool 420 among various model pools (e.g., model pool A, model pool B) based on model-agnostic performance metrics generated by a metric standardizer 408. In contrast to the resource allocation operations of FIG. 3, which are performed in response to observed changes in model-agonistic utilization metrics, the system 400 performs dynamic resource allocation in response to observed changes in one or more model-agnostic latency metrics, shown in FIG. 4 as "model-agnostic latency metrics 417."

Like other examples shown herein, it is assumed that Model Pool A supports instances of Model A and Model Pool B supports instances of Model Pool B, where Model A and Model B are different LLMs that process text using different tokenization schemes. In the system 400, the metric standardizer 414 receives token-based latency metrics 410 generated in association with various processing jobs executed by the instances of Model A and Model B. Additionally, the metric standardizer 414 receives token-based job metrics 409 for each job processed by each instance of Model A and Model B deployed within the MaaS platform 402. The token-based job metrics 409 include at least a model instance identifier 411 as well as an input/output token sequence 413 that identifies the input token sequence and output token sequence processed by the corresponding model instance during the corresponding processing job.

In one implementation, each model instance executes within a container that is configured to transmit the token-based job metrics 409 to the metric standardizer 408 upon completion of each processing job. Additionally, the container generates and transmits token-based latency metrics 410 in association with some or all processing jobs of the model instances.

The token-based latency metrics 410 quantify latency observed during execution of LLM processing tasks executed by different LLMs deployed in the different model pools (e.g., Model Pool A, Model Pool B) that are configured to process tokens according to different tokenization schemes. In one implementation, the token-based latency metrics 410 include a time-to-last token (TTLT), which measures how fast the LLM model can produce the last token in the response. The example described below provides for use of the TTLT to determine a model-agnostic per-token latency estimate that can be compared directly between models to assess relative latency. In other implementations, the token-based latency metrics 410 may additionally or alternatively include a time-to-first-token (TTFT), which measures how fast the LLM model can produce the first token in the response and/or a time-between-tokens (TBT), which measures how consistent the LLM model is in producing tokens at a regular interval. As the load increases, TBT may increase, and the generation rate may decrease. A formula for computing TBT is given by:

$$TBT = \frac{(TTLT - TTFT)}{NumberTokens_{generated}}$$

Since Model A and Model B implement different tokenization schemes, there exist scenarios where identical input strings can be processed as different numbers of tokens. Likewise, if Model A and Model B were to generate identical outputs strings, the identical output strings may be processed as different numbers of tokens. Notably, the different tokenization schemes may also depend upon different (LLM-specific) vocabularies, meaning that actual outputs returned by Model A and Model B are likely to differ in verbiage, even if generated based on identical input strings.

In view of these model-to-model differences that stem from the reliance on different tokenization schemes, the token-based latency metrics 410 (e.g., TBT, TTLT, and/or TTFT) cannot be used as a reliable means for assessing latency of different LLMs relative to one another. This shortcoming is addressed by various subcomponents of the metric standardizer 414 of FIG. 4 that facilitate conversion of the token-based latency metrics 410 to model-agnostic units representative of latency, represented in FIG. 4 as the model-agnostic latency metrics 417.

The model-agnostic latency metrics 417 may include the same or similar types of metrics as those discussed with respect to the token-based latency metrics 410; however, the token-based latency metrics 410 are generated per a methodology that ensures consistency across models. Assume, for example, that an instance of Model A reports a TTLT of 0.8 seconds and an instance of Model B reports a TTLT of 1.1 seconds. These initially-reported values for the token-based latency metrics 410 do not necessarily imply that the instance of Model B is experiencing higher latency than the instance of Model A to output identical text (e.g., because it may be that the generated token sequences are very different from one another). In some cases, it may be that Model B instance is actually experiencing less latency than the Model A instance, even if the Model B instance reports a higher TTLT value because model B has generated a higher quality response with a larger number of output tokens to answer the same question.

In the system 400, a token sequence-length normalizer 416 is tasked with token sequence normalization operations designed to adjust the length (in number of tokens) of the input/output token sequences 413 to account for differences in token sequence length that arise from the use of different tokenization schemes. Assume for example, Model A and Model B process a same input text string and generate output sequences with variable numbers of tokens due to differences in their respective tokenization schemes. When the token sequence-length normalizer 416 is utilized to normalize the length of these two respective output sequences (e.g., in terms of total number of tokens), this results in two different normalized-length output token sequences 418 that are either identical in length or more similar in length than the original two output sequences, with the remaining degree of difference in token sequence length being within a predefined margin of error that depends on the token conversion (normalization) techniques employed in any given implementation.

In different implementations, the token sequence-length normalizer 416 implements various different techniques to normalize the length of the output token sequence. These techniques aim, in general, to reformat the output token sequence of each input/output token sequence 413 in the vocabulary of a "Master LLM" using a "Master Tokenization Scheme." As used here, the term "Master LLM" refers to any LLM that is selected and used, by the metric standardizer 308, to normalize the length of output token sequences as described herein. The Master LLM can, in various implementations, be any LLM used to provide the herein-described functionality of the Master LLM. Likewise, the term "Master Tokenization Scheme" refers to the tokenization scheme that is used by the Master LLM, regardless of the identify of the Master LLM and/or of the individual characteristics of the Master LLM that may vary from one implementation to another.

There exist two different approaches that further the above-described end goal of reformatting the output token sequence of each input/output token sequence 413 in the vocabulary of a "Master LLM" using the "Master Tokenization Scheme." Under a first approach to generating the normalized-length output sequences 418, the original input string is tokenized according to the Master Tokenization Scheme and "re-processed" by the Master LLM (e.g., with the original bounds in place on output size) to yield a corresponding, output sequence with a length (in number of tokens) that has now been normalized to a common tokenization scheme. Assume, for example, a first pair of the input/output token sequences 413 includes a first sequence embedding the input string "What is a popular nursery rhyme about a sheep?" and a second sequence embedding the output string: "Mary had a little lamb." Under the above-described "first approach," the token sequence-length normalizer 416 uses the Master Tokenization Scheme to tokenize the input string and the result is input to the Master LLM, yielding a master tokenized output sequence. In this case, the master tokenized output sequence is an actual of the Master LLM that has been generated based on the same input text string.

Under a second approach to generating the normalized-length output sequences 418, various techniques are employed to "translate" the original output token sequence to a corresponding most similar sequence in the token vocabulary of a select Master Tokenization Scheme. This differs from the above-described "first approach" in that it attempts to reconstruct output of a Master LLM and Master Tokenization scheme by way of "smart translation" of the original output sequence without actually invoking the Master LLM to re-process the original query and generate a new output sequence. While not as straight-forward to implement, some solutions geared to this "translation" approach are more cost-effective in terms of processing overhead.

In one implementation adopting the above-described "translation" (e.g., second) approach the normalized-length output sequences 418 are generated by translating each original output token sequence to the vocabulary of the Master LLM (e.g., the vocabulary defined by the Master Tokenization Scheme), such as by using semantic similarity and/or frequency of corresponding tokens. This approach may require some training data and additional computational requirements and may not guarantee a perfect alignment of the tokens.

In another implementation adopting the above-described "translation" approach," the normalized-length output sequences 418 are generated using a neural machine translation (NMT) model trained to convert the tokens of the original tokenization scheme to tokens of the select Master Tokenization scheme. Commonly, NMT models are used to provide translation from one language to another, with popular publicly-available NMTs including Google Translate® and Baidu Translate®. In the herein-proposed instance of token sequence translation, the same base NMT model(s) could be trained on sets of output token sequences generated by different LLMs in response to tokenization and processing of identical input text strings. This approach may require model fine-tuning and may introduce some errors or noise in the token translation.

In still another implementation adopting the above-described "translation" approach, the normalized-length output sequences 418 are generated by using a token embedding to map the tokens of the original output sequence to corresponding tokens of the Master Tokenization scheme. For example, one could use a word embedding model such as Word2Vec to convert the tokens of the original LLM model to a vector representation. Then, a nearest neighbor search or a clustering algorithm is employed to find the corresponding tokens of the Master LLM.

Various other approaches can likewise be adopted to accomplish the above-described translation, with the uniformity in length of corresponding normalized outputs sequences (e.g., those generated based on outputs to a same original input query) varying according to the select normalization approach. Assume, for example, two LLMs are asked to create a 3-day travel itinerary for a trip to Paris. One model generates a 304-word itinerary and another model output a 411-word itinerary. Using the "first approach" to normalization described above (e.g., re-generation of the output sequence using a master LLM), the two resulting normalized-length output sequences 418 are identical in length. Per other approaches, the resulting normalized-length output sequences are more similar in length than they were originally (e.g., +/5% different or other identified error margin that is statistically guaranteed by the select normalization method and deemed acceptable for the use case of the model-agnostic latency metrics 417).

The token converter 416 each of the normalized-length output sequences 418 to a latency metric computation engine 426 that also receives a corresponding set of the token-based latency metrics 410 generated by the LLM that originally processed the corresponding query. In the example discussed below, the token-based latency metrics 410 include at least a time-to-last token (TTLT), representing a total time that the original LLM took to generate the original output sequence. Using this TTLT and the corresponding normalized-length output sequence, the latency metric computation engine 426 generates a model-agnostic latency metric (e.g., the model agnostic latency metrics 417).

In different implementations, normalized latency can be determined in different ways. In scenarios where multiple GPUs are deployed in support of the original LLM, it may be desirable to first determine a quantity of the tokens in the normalized output sequences that are generated "per-GPU." Assume, for example, that a given instance of Model A is running on 24 GPUs and that this model generates an original output token sequence of 800 words in 60 seconds. Further assume that the original 800-word output sequence has been normalized, per the above-described operations, to generate a normalized-length output sequence that is 754 words. In this scenario, the latency metric computation engine 426 next determines a "Normalized Number of Tokens-per-GPU" by dividing the 754 tokens in the normalized-length output sequence by the 24 GPUs, yielding 30 (754/24–30). Following this, the latency metric computation engine 426 determines a Normalized Time-Per-Token for the given processing job by dividing the "Normalized Number of Tokens-per-GPU" (e.g., 30) by the originally-reported TTLT. Assuming, for example, that the originally-reported TTLT was 60 seconds, the Normalized Time-Per-Token is then (30 tokens)/(60 seconds), which is 0.5 seconds per token. This "Normalized Time-Per-Token" represents a model-agnostic latency metric that can be readily compared to like-determined latency metrics for other models.

In other implementations, other types of model-agnostic latency metrics can be derived using techniques the same or similar to those described above to provide alternative benchmarks for comparing latency and also response quality (e.g., assuming longer generations corresponding to higher quality) across models.

In one implementation, the model-agnostic latency metrics corresponding to each model pool are aggregated (e.g., averaged) to derive a pool-specific latency metric that is, in turn, used to assess overall latency of the model pool in comparison to the other model pool(s) of the MaaS platform 402.

Like FIG. 3, the MaaS platform 402 includes a control plane 424 with an autoscaler 412 that performs dynamic resource allocation of GPU capacity in response to determining that model-agnostic latency metrics computed for a given pool satisfying some predefined criteria. In FIG. 4, a first subset 442 represents GPU resources allocated to Model Pool A while a second subset 444 of resources represents GPU resources allocated to Model Pool B. The autoscaler 412 issues reallocation instructions to a VM provisioning layer 422 that cause reallocation of the GPU resources in the subsets 442 and 444, such as by moving resources between the subsets or by transferring resources among other model pools supported by the MaaS platform 402.

In the system 400, each GPU reallocation is performed by a VM provisioning layer 422 in response to a reallocation instruction issued by the autoscaler 412. The autoscaler 412 transmits a "scale-up" reallocation instruction in response to determining to determining that the model-agnostic latency metrics 417 for that pool satisfy "scale-up criteria." For example, the up-scale criteria is satisfied when the average TTFT, TBT, or TTLT or other latency metric for a given model pool exceeds a set threshold.

In the same or another implementation, the autoscaler 412 transmits a "scale-down" reallocation instruction to the provisioning layer 422 in response to determining that the model-agnostic latency metrics 417 for that pool satisfy "down-scale criteria." For example, the down-scale criteria is satisfied when the average TTFT, TBT, or TTLT or other latency metric for a given model pool drops below a set threshold.

In one implementation, GPU resources are dynamically allocated to and removed from the subsets 442 and 444 in finite, static incrementations. For example, a set number of GPUs is added to the subset 442 each time the model-agnostic latency metrics 417 for Model Pool A satisfy the up-scale criteria and the same or a different static number of GPUs is subtracted from the subset 442 each time the model-agnostic latency metrics 417 for Model Pool A satisfy the down-scale criteria. Other example characteristics of and/or functionality provided by the MaaS platform 402 not explicitly described with respect to FIG. 4 may be the same or similar to the MaaS platform of FIG. 3.

Figure 5:
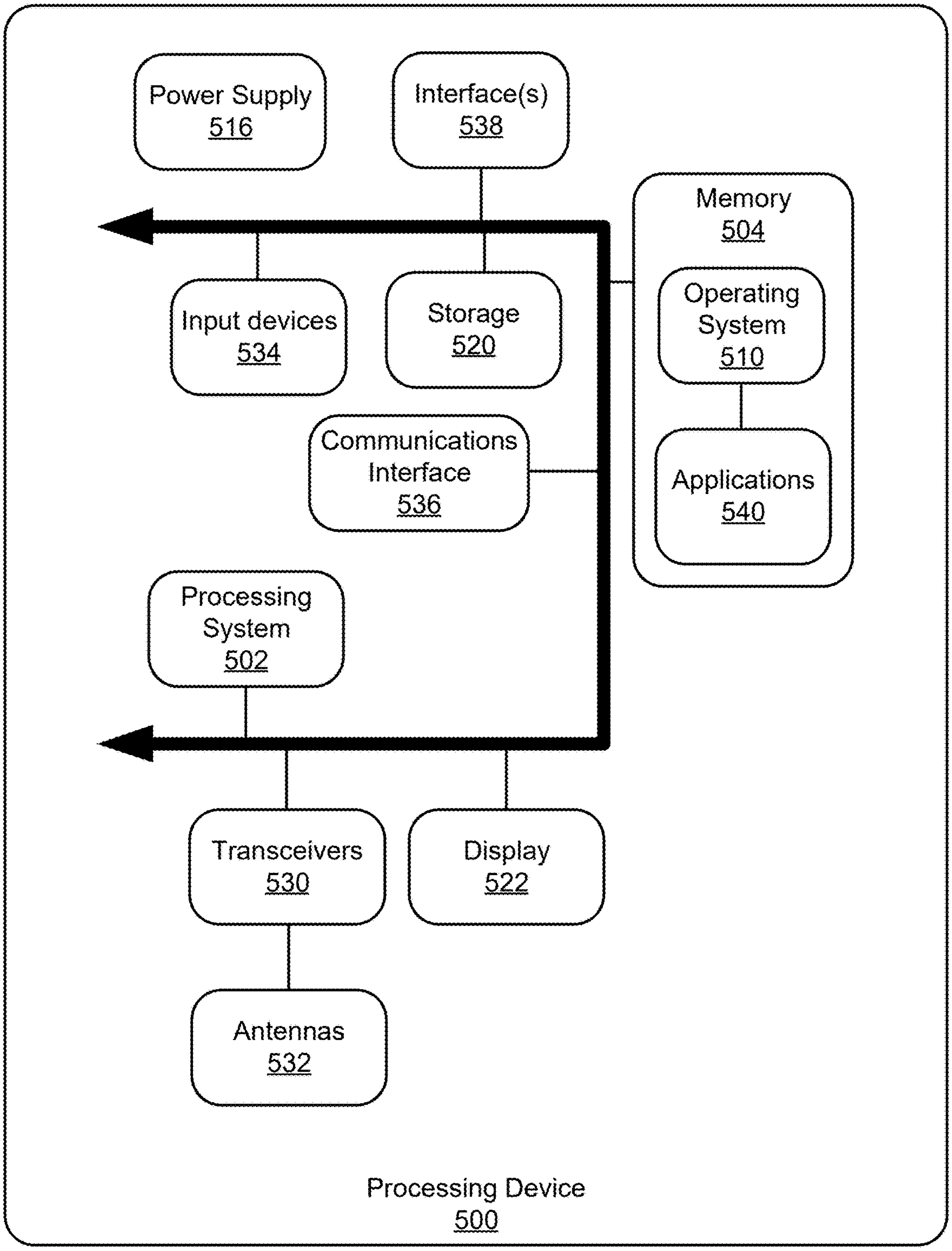
FIG. 5 illustrates an example schematic of a processing device suitable for implementing aspects of the disclosed technology.

FIG. 5 illustrates an example schematic of a processing device 540 suitable for implementing aspects of the disclosed technology. The processing device 500 includes one or more processor unit(s) 502, memory device(s) 504, a display 506, and other interfaces 508 (e.g., buttons). The processor unit(s) 502 may each include one or more CPUs, GPUs, etc.

The memory device(s) 504 generally includes both volatile memory (e.g., RAM) and non-volatile memory (e.g., flash memory). An operating system 510, such as the Microsoft Windows® operating system, the Microsoft Windows® Phone operating system or a specific operating system designed for a gaming device, resides in the memory device(s) 504 and is executable by the processor unit(s) 502, although it should be understood that other operating systems may be employed.

One or more applications 512 (e.g., LLMs, the throttling service 204, the metric standardizer 314 or the autoscaler 312) are loaded in the memory device(s) 504 and executed on the operating system 510 by the processor unit(s) 502. In some implementations, one o or more of the applications are distributed applications loaded into memory of multiple different processing devices connected across a network.

The applications 512 may receive inputs from one another as well as from various input local devices such as a microphone 534, input accessory 535 (e.g., keypad, mouse, stylus, touchpad, gamepad, racing wheel, joystick), and a camera 632. Additionally, the applications 512 may receive input from one or more remote devices, such as remotely-located smart devices, by communicating with such devices over a wired or wireless network using more communication transceivers 530 and an antenna 538 to provide network connectivity (e.g., a mobile phone network, Wi-Fi®, Bluetooth®). The processing device 500 may also include one or more storage devices 528 (e.g., non-volatile storage). Other configurations may also be employed.

The processing device 500 further includes a power supply 516, which is powered by one or more batteries or other power sources and which provides power to other components of the processing device 500. The power supply 516 may also be connected to an external power source (not shown) that overrides or recharges the built-in batteries or other power sources.

The processing device 500 may include a variety of tangible computer-readable storage media and intangible computer-readable communication signals. Tangible computer-readable storage can be embodied by any available media that can be accessed by the processing device 500 and includes both volatile and nonvolatile storage media, removable and non-removable storage media. Tangible computer-readable storage media excludes intangible and transitory communications signals and includes volatile and nonvolatile, removable, and non-removable storage media implemented in any method or technology for storage of information such as computer readable instructions, data structures, program modules or other data. Tangible computer-readable storage media includes RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information, and which can be accessed by the processing device 600. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, intangible communication signals include wired media such as a wired network or direct-wired connection, and wireless media such as acoustic, RF, infrared and other wireless media.

In some aspects, the techniques described herein relate to a model-as-a-service platform including: a metric standardizer that: determines model-specific benchmark metrics that define relationships between GPU utilization and token processing according to different tokenization schemes; receives token-based job metrics identifying quantities of tokens processed by different LLMs according to the different tokenization schemes; and utilizes the model-specific benchmark metrics and the token-based job metrics to generate model pool utilization metrics that each quantifies resource utilization for a corresponding one of two or more model pools supporting instances of different LLMs, the model pool utilization metrics being expressed in units of a model-agnostic unit type; and an autoscaler that dynamically reallocates GPU resources among the model pools based on the model pool utilization metrics.

In some aspects, the techniques described herein relate to a model-as-a-service platform, wherein the model pool utilization metrics include a first utilization metric for a first model pool, and wherein the metric standardizer determines the first utilization metric for the first model pool based, at least in part, on a computational load determined with respect to each of multiple of LLM processing tasks executed by LLMs deployed within a same model pool.

In some aspects, the techniques described herein relate to a model-as-a-service platform, wherein the autoscaler dynamically allocates the GPU resources by removing a subset of GPU resources from a memory map utilized by a first model pool and by adding the subset of GPU resources to a memory map utilized by a second model pool, the first model pool and the second model pool executing LLMs that implement different tokenization schemes.

In some aspects, the techniques described herein relate to a model-as-a-service platform, wherein the model pool utilization metrics include a first utilization metric for a first model pool and a second utilization metric for a second model pool and wherein the autoscaler dynamically reallocates the GPU resources in response to determining that the second utilization metric exceeds a target utilization.

In some aspects, the techniques described herein relate to a model-as-a-service platform, wherein each of the model pool utilization metrics is based, at least in part, on a computational load determined for an LLM processing task executed by a first LLM deployed in a first GPU architecture, and wherein the metric standardizer determines the computational load based on a relevant set of the model-specific benchmark metrics that model a max utilization for the first LLM deployed within the first GPU architecture.

In some aspects, the techniques described herein relate to a model-as-a-service platform, wherein the model-agnostic unit type is a logical unit of GPU capacity that facilitates direct comparison of memory utilization across the different LLMs without unitary conversion or normalization.

In some aspects, the techniques described herein relate to a model-as-a-service platform, wherein the model-agnostic unit type is a unit of token throughput representing a quantity of tokens that varies based on characteristics of each different workload being quantified by the model-agnostic unit type.

In some aspects, the techniques described herein relate to a method of resource allocation among model pools of a model-as-a-service platform, the method including: determining model-specific benchmark metrics that define relationships between graphics processing unit (GPU) utilization and token processing for instances of different large language models (LLMs) deployed in the model pools; receiving token-based job metrics identifying quantities of tokens processed during execution of LLM processing tasks executed by the instances of the different LLMs; and determining model pool utilization metrics for the model pools based on the model-specific benchmark metrics and the token-based job metrics, the model pool utilization metrics being expressed in units of a model-agnostic unit type; and dynamically reallocating GPU resources among the model pools based on the model pool utilization metrics.

In some aspects, the techniques described herein relate to a method, wherein the model pool utilization metrics include a first utilization metric for a first model pool, and wherein the method further includes determining the first utilization metric for the first model pool based, at least in part, on a computational load determined with respect to each of multiple of the LLM processing tasks executed by LLMs deployed within the first model pool.

In some aspects, the techniques described herein relate to a method, wherein dynamically reallocating the GPU resources includes removing a subset of GPU resources from a memory map utilized by a first model pool and by adding the subset of GPU resources to a memory map utilized by a second model pool, the first model pool and the second model pool executing LLMs that implement different tokenization schemes.

In some aspects, the techniques described herein relate to a method, wherein the model pool utilization metrics include a first utilization metric for a first model pool and a second utilization metric for a second model pool and wherein the method further includes dynamically reallocating the GPU resources in response to determining that the second utilization metric exceeds a target utilization.

In some aspects, the techniques described herein relate to a method, wherein each of the model pool utilization metrics is based, at least in part, on a computational load determined for an LLM processing task executed by a first LLM deployed in a first GPU architecture, and wherein the method further includes determining the computational load based on a max utilization observed for the first LLM deployed within the first GPU architecture.

In some aspects, the techniques described herein relate to a method, wherein the different LLMs include one or more multimodal LLMs that tokenize input strings representing image, audio, or video data.

In some aspects, the techniques described herein relate to a method, wherein the model-agnostic unit type is a unit of token throughput representing a quantity of tokens that varies based on characteristics of each different workload being quantified by the model-agnostic unit type.

In some aspects, the techniques described herein relate to one or more tangible computer-readable storage media storing processor-executable instructions for executing a computer process for reallocating resources among model pools executing instances of different large language models (LLMs) in a model-as-a-service platform, the computer process including: determining model-specific benchmark metrics that define relationships between GPU utilization and token processing according to different tokenization schemes; receiving token-based job metrics identifying quantities of tokens processed by the different LLMs according to the different tokenization schemes; utilizing the model-specific benchmark metrics and the token-based job metrics to generate model pool utilization metrics for model pools supporting instances of different LLMs, the model pool utilization metrics being expressed in units of a model-agnostic unit type; and an autoscaler that dynamically reallocates GPU resources among the model pools based on the model pool utilization metrics.

In some aspects, the techniques described herein relate to one or more tangible computer-readable storage media, wherein the model pool utilization metrics include a first utilization metric for a first model pool, and wherein the computer process further includes determining the first utilization metric for the first model pool based, at least in part, on a computational load determined with respect to each of multiple LLM processing tasks executed by LLMs deployed within the first model pool.

In some aspects, the techniques described herein relate to one or more tangible computer-readable storage media, wherein dynamically reallocating the GPU resources includes removing a subset of GPU resources from a memory map utilized by a first model pool and by adding the subset of GPU resources to a memory map utilized by a second model pool, the first model pool and the second model pool executing LLMs that implement different tokenization schemes.

In some aspects, the techniques described herein relate to one or more tangible computer-readable storage media, wherein the model pool utilization metrics include a first utilization metric for a first model pool and a second utilization metric for a second model pool and wherein the computer process further includes dynamically reallocating the GPU resources in response to determining that the second utilization metric exceeds a target utilization.

In some aspects, the techniques described herein relate to one or more tangible computer-readable storage media, wherein the model pool utilization metrics include a first utilization metric for a first model pool and the first utilization metric is based, at least in part, on a computational load determined for a respective LLM processing task executed by a first LLM deployed in a first GPU architecture, and wherein the computer process further includes determining the computational load based on a max utilization observed for the first LLM deployed within the first GPU architecture.

In some aspects, the techniques described herein relate to one or more tangible computer-readable storage media, wherein the model-agnostic unit type is a logical unit of GPU capacity that facilitates direct comparison of memory utilization across the different LLMs without unitary conversion or normalization.

The logical operations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language. The above specification, examples, and data, together with the attached appendices, provide a complete description of the structure and use of example implementations.

What is claimed is:

1. A model-as-a-service platform including:

a metric standardizer that:

determines model-specific benchmark metrics that define relationships between GPU utilization and token processing according to different tokenization schemes;

receives token-based job metrics identifying quantities of tokens processed by different LLMs according to the different tokenization schemes; and utilizes the model-specific benchmark metrics and the token-based job metrics to generate model pool utilization metrics that each quantifies resource utilization for a corresponding one of two or more model pools supporting instances of different LLMs, the model pool utilization metrics being expressed in units of a model-agnostic unit type; and an autoscaler that dynamically reallocates GPU resources among the model pools based on the model pool utilization metrics.

2. The model-as-a-service platform of claim 1, wherein the model pool utilization metrics include a first utilization metric for a first model pool, and wherein the metric standardizer determines the first utilization metric for the first model pool based, at least in part, on a computational load determined with respect to each of multiple of LLM processing tasks executed by LLMs deployed within a same model pool.

3. The model-as-a-service platform of claim 1, wherein the autoscaler dynamically allocates the GPU resources by removing a subset of GPU resources from a memory map utilized by a first model pool and by adding the subset of GPU resources to a memory map utilized by a second model pool, the first model pool and the second model pool executing LLMs that implement different tokenization schemes.

4. The model-as-a-service platform of claim 3, wherein the model pool utilization metrics include a first utilization metric for a first model pool and a second utilization metric for a second model pool and wherein the autoscaler dynamically reallocates the GPU resources in response to determining that the second utilization metric exceeds a target utilization.

5. The model-as-a-service platform of claim 1, wherein each of the model pool utilization metrics is based, at least in part, on a computational load determined for an LLM processing task executed by a first LLM deployed in a first GPU architecture, and wherein the metric standardizer determines the computational load based on a relevant set of the model-specific benchmark metrics that model a max utilization for the first LLM deployed within the first GPU architecture.

6. The model-as-a-service platform of claim 1, wherein the model-agnostic unit type is a logical unit of GPU capacity that facilitates direct comparison of memory utilization across the different LLMs without unitary conversion or normalization.

7. The model-as-a-service platform of claim 1, wherein the model-agnostic unit type is a unit of token throughput representing a quantity of tokens that varies based on characteristics of each different workload being quantified by the model-agnostic unit type.

8. A method of resource allocation among model pools of a model-as-a-service platform, the method comprising:

determining model-specific benchmark metrics that define relationships between graphics processing unit (GPU) utilization and token processing for instances of different large language models (LLMs) deployed in the model pools;

receiving token-based job metrics identifying quantities of tokens processed during execution of LLM processing tasks executed by the instances of the different LLMs; and determining model pool utilization metrics for the model pools based on the model-specific benchmark metrics and the token-based job metrics, the model pool utilization metrics being expressed in units of a model-agnostic unit type; and dynamically reallocating GPU resources among the model pools based on the model pool utilization metrics.

9. The method of claim 8, wherein the model pool utilization metrics include a first utilization metric for a first model pool, and wherein the method further comprises determining the first utilization metric for the first model pool based, at least in part, on a computational load determined with respect to each of multiple of the LLM processing tasks executed by LLMs deployed within the first model pool.

10. The method of claim 8, wherein dynamically reallocating the GPU resources comprises removing a subset of GPU resources from a memory map utilized by a first model pool and by adding the subset of GPU resources to a memory map utilized by a second model pool, the first model pool and the second model pool executing LLMs that implement different tokenization schemes.

11. The method of claim 8, wherein the model pool utilization metrics include a first utilization metric for a first model pool and a second utilization metric for a second model pool and wherein the method further comprises dynamically reallocating the GPU resources in response to determining that the second utilization metric exceeds a target utilization.

12. The method of claim 8, wherein each of the model pool utilization metrics is based, at least in part, on a computational load determined for an LLM processing task executed by a first LLM deployed in a first GPU architecture, and wherein the method further comprises determining the computational load based on a max utilization observed for the first LLM deployed within the first GPU architecture.

13. The method of claim 8, wherein the different LLMs include one or more multimodal LLMs that tokenize input strings representing image, audio, or video data.

14. The method of claim 8, wherein the model-agnostic unit type is a unit of token throughput representing a quantity of tokens that varies based on characteristics of each different workload being quantified by the model-agnostic unit type.

15. One or more tangible computer-readable storage media storing processor-executable instructions for executing a computer process for reallocating resources among model pools executing instances of different large language models (LLMs) in a model-as-a-service platform, the computer process comprising:

determining model-specific benchmark metrics that define relationships between GPU utilization and token processing according to different tokenization schemes;

receiving token-based job metrics identifying quantities of tokens processed by the different LLMs according to the different tokenization schemes;

utilizing the model-specific benchmark metrics and the token-based job metrics to generate model pool utilization metrics for model pools supporting instances of different LLMs, the model pool utilization metrics being expressed in units of a model-agnostic unit type; and an autoscaler that dynamically reallocates GPU resources among the model pools based on the model pool utilization metrics.

16. The one or more tangible computer-readable storage media of claim 15, wherein the model pool utilization metrics include a first utilization metric for a first model pool, and wherein the computer process further comprises determining the first utilization metric for the first model pool based, at least in part, on a computational load determined with respect to each of multiple LLM processing tasks executed by LLMs deployed within the first model pool.

17. The one or more tangible computer-readable storage media of claim 15, wherein dynamically reallocating the GPU resources comprises removing a subset of GPU resources from a memory map utilized by a first model pool and by adding the subset of GPU resources to a memory map utilized by a second model pool, the first model pool and the second model pool executing LLMs that implement different tokenization schemes.

18. The one or more tangible computer-readable storage media of claim 15, wherein the model pool utilization metrics include a first utilization metric for a first model pool and a second utilization metric for a second model pool and wherein the computer process further comprises dynamically reallocating the GPU resources in response to determining that the second utilization metric exceeds a target utilization.

19. The one or more tangible computer-readable storage media of claim 15, wherein the model pool utilization metrics include a first utilization metric for a first model pool and the first utilization metric is based, at least in part, on a computational load determined for a respective LLM processing task executed by a first LLM deployed in a first GPU architecture, and wherein the computer process further comprises determining the computational load based on a max utilization observed for the first LLM deployed within the first GPU architecture.

20. The one or more tangible computer-readable storage media of claim 15, wherein the model-agnostic unit type is a logical unit of GPU capacity that facilitates direct comparison of memory utilization across the different LLMs without unitary conversion or normalization.

* * * * *